UNITED STATES PATENT OFFICE.

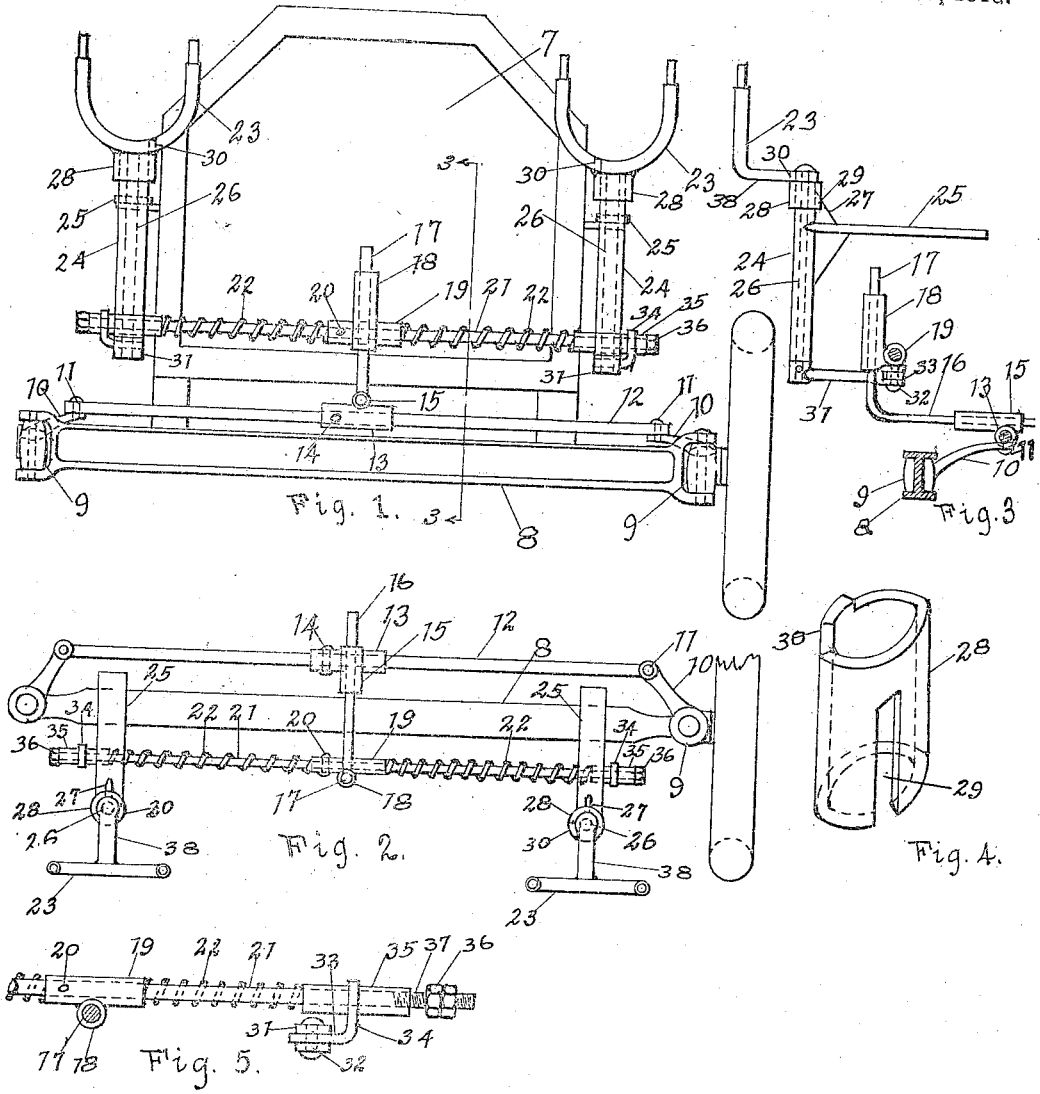

WILLIAM CLARY, OF GOLDENDALE, WASHINGTON.

DIRIGIBLE HEADLIGHT FOR AUTOMOBILES.

1,295,434.  Specification of Letters Patent.  Patented Feb. 25, 1919.

Application filed March 11, 1918. Serial No. 221,836.

*To all whom it may concern:*

Be it known that I, WILLIAM CLARY, a citizen of the United States, and a resident of the city of Goldendale, county of Klickitat, and State of Washington, have invented certain new and useful Improvements in Dirigible Headlights for Automobiles, of which the following is a specification.

My invention relates to improvements in dirigible headlights for automobiles in general, and more particularly to that type of dirigible headlights shown in U. S. Patent #1,233,027, issued to the applicant on July 10, 1917, the present invention being an improvement on the earlier construction.

The principal object of the present invention is to provide a mechanism which shall selectively operate one of a pair of dirigible headlights to conform to the direction of turning of the front wheels of an automobile, the other headlight remaining in fixed relation to the balance of the car. A further object is to turn only the light which is nearest to the pivotal point of the turning of the car, which light will hereinafter be designated as the "inside" light, the other light being designated as the "outside" light. A further object is to provide a mechanism which will turn the "inside" light in the direction of and approximately in the same degree as the turning of the car, while the "outside" light remains in a normally forward position during said turning process. A further object is to provide a mechanism so that neither of the lights will be affected or operated by the minor oscillations, vibrations or turnings of the front wheels or steering mechanism. Another object is to provide a mechanism that is simple, durable and practicable for the purpose considered.

With these objects in view, my invention relates more particularly to that form of construction shown in the accompanying drawings and in these specifications, it being understood that I claim such modifications thereof as legitimately come within the scope of the appended claims.

In the drawings, Figure 1 shows a front elevation of a portion of an automobile with the mechanism mounted thereon. Fig. 2 is a plan view of the mechanism showing a portion of the front axle and connecting rod of the car. Fig. 3 is an end elevation taken on line 3—3 of Fig. 1. Fig. 4 is a perspective view of the stop motion collar. Fig. 5 is a fragmentary enlarged view of a portion of the connecting mechanism between the lights.

With more particular reference to the drawings, the numeral 7 indicates the body of the car as a whole, 8 being the front axle, 9 the front steering knuckles, 10 indicates the steering knuckle controlling arms pivotally connected at 11 to the connecting rod 12. Fixedly mounted on rod 12 as by pin 14 is a sleeve 13 integrally formed with a second sleeve 15 at right angles to and positioned above sleeve 13. A rod 16 upwardly turned as at 17 is slidably mounted within sleeve 15, and on its upturned end 17 is slidably mounted a vertical sleeve 18 integrally formed at right angles to and out of alinement with a horizontal sleeve 19 which is fixedly mounted as by pin 20 to a horizontal rod 21 carrying on either side of sleeve 19 a helical compression spring 22.

A pair of headlight brackets 23 are fixedly mounted on vertical shafts 26 operatively mounted in bearings 24 supported by brackets 25 which may be attached as desired to any suitable portion of the automobile construction. Collars 28 having locking slots 29 and upwardly projecting lugs 30 are mounted on the upper end of bearings 24, a vertical rib 27 being provided on each of said bearings to engage its respective slot 29 and prevent collars 28 from rotative motion. The brackets 23 are off-set forwardly as by arms 38, one edge of each of said arms when in forward position coming operatively in contact with one edge of its adjacent lug 30 to prevent the rotation of its respective headlight beyond the medial line in the direction of the central longitudinal axis of the machine. On the lower ends of shafts 26 are fixedly mounted arms 31 pivotally connected as at 32 to connecting brackets 33 which are upwardly turned as at 34, sleeves 35 being fixedly attached to this upturned portion, these sleeves being operatively mounted on and near each extremity of rod 21 in operative contact with springs 22. Rod 21 has suitable lock nuts 36 mounted on the threaded ends 37 of said rod outside of sleeves 35.

In operation, any lateral motion of connecting rod 12 due to turning of the steering wheels will be transmitted through rod 16 to horizontal rod 21. As this rod moves, say, to the right it will move the left hand headlight in a rotative direction and essentially in the same degree as the turning of the front wheels, the right hand bracket being prevented from turning by lug 30 on collar 28, the motion of rod 21 on this bracket being compensated for by compression of the adjacent spring.

As the front wheels are again brought to a central position spring 22 brings the displaced light back to normal position and a further motion of rod 12 in the opposite direction will repeat the process with the opposite light. If the lock nuts 36 are positioned slightly apart from sleeve 35 as shown in Fig. 5, it is evident that rod 21 may have a small lateral motion that will not affect sleeves 35 and consequently brackets 23, and by suitable positioning of these nuts it would be evident that the mechanism may be so adjusted so that minor variations of the steering wheels and rod will not affect the position of brackets 23 and consequently of the headlights thereon mounted. It will thus be seen that I have provided a mechanism that will fulfil the various objects as stated herein, and that is very simple, durable and practicable.

It is evident that, by mounting both the horizontal and the vertical portions of the bent connecting rod which operates between the connecting rods for the steering knuckles and the connecting rod for the lamp brackets in the sleeves 15 and 18, that I have provided a flexible connection which will allow free action of the automobile springs, and will compensate for any relative motion or movements horizontally of the various elements so connected.

Having thus described a preferred form of my invention, what I claim as new and desire to protect by these Letters Patent is:

1. In combination with a pair of lamp brackets mounted to rotate horizontally in a pair of supporting brackets, rearwardly extending arms fixed to the lower ends of said lamp brackets, sleeves pivotally connected to said arms, a rod operatively mounted in said sleeves, lock nuts on either end of said rod exteriorly of said sleeves, a collar fixed to said rod medially of said sleeve, helical springs surrounding said rod between said collar and said sleeves, stop collars mounted on said supporting brackets having lugs thereon to contact with said lamp brackets to prevent rotation of said lamp brackets in one direction from a medial position, and means for attaching said collar to the tie rod between the steering knuckles of a motor vehicle, as and for the purpose described.

2. In combination with an automobile and steering mechanism therefor, a pair of lamp brackets rotatably mounted in fixed supporting brackets, stop collars mounted on said supporting brackets to engage each of said lamp brackets to prevent rotation thereof in one direction from their medial position, rearwardly extending arms fixed to said lamp brackets, a tie rod slidably mounted in sleeves on said arms, a central sleeve attached to said tie rod, helical springs surrounding said rod between said central sleeves and said aforementioned sleeves and means operated by said steering mechanism for imparting horizontal motion to said tie rod, for the purpose described.

In testimony whereof I have signed my name to this specification in the presence of two subscribing witnesses.

WILLIAM CLARY.

Witnesses:
 HENRY C. WALKER,
 RICHARD PETERSON.